United States Patent [19]
Winter

[11] Patent Number: 5,879,504
[45] Date of Patent: Mar. 9, 1999

[54] PORTABLE APPARATUS FOR REMOVING HEAT SOFTENABLE SURFACE COVERINGS

[75] Inventor: Phillip M. Winter, St. Paul, Minn.

[73] Assignee: Minnesota Mining and Manufacturing Company, St. Paul, Minn.

[21] Appl. No.: 868,915

[22] Filed: Jun. 4, 1997

[51] Int. Cl.⁶ .................................................. B32B 35/00
[52] U.S. Cl. ............................ 156/344; 156/584; 7/100; 7/124; 15/3.53; 15/425; 451/59; 451/259
[58] Field of Search ....................... 156/154, 344, 156/584; 15/3.53, 424, 425; 451/59, 259; 7/100, 124

[56] References Cited

U.S. PATENT DOCUMENTS

| | | | |
|---|---|---|---|
| 4,055,897 | 11/1977 | Brix ........................................ | 433/166 |
| 4,133,144 | 1/1979 | Early et al. . | |
| 4,174,783 | 11/1979 | Abe et al. ............................... | 215/12.2 |
| 4,189,407 | 2/1980 | Yaggi, Jr. ................................ | 524/775 |
| 4,336,072 | 6/1982 | Moore et al. . | |
| 4,348,446 | 9/1982 | Mitsuishi et al. ....................... | 428/148 |
| 4,406,707 | 9/1983 | Moore et al. . | |
| 4,690,724 | 9/1987 | Outlaw . | |
| 4,886,705 | 12/1989 | Sakamoto ................................ | 428/328 |
| 4,933,373 | 6/1990 | Moren . | |
| 4,943,507 | 7/1990 | Takahashi et al. ...................... | 430/120 |
| 4,960,664 | 10/1990 | Yamada et al. ......................... | 430/109 |
| 5,035,849 | 7/1991 | Uemura et al. ......................... | 264/255 |
| 5,102,938 | 4/1992 | Roberts ................................... | 524/287 |
| 5,190,620 | 3/1993 | Winter .................................... | 156/344 |
| 5,259,914 | 11/1993 | Fisher .................................... | 156/584 |
| 5,269,874 | 12/1993 | Winter .................................... | 156/584 |
| 5,412,069 | 5/1995 | LeCompte et al. ..................... | 528/374 |
| 5,464,891 | 11/1995 | Nagaoka et al. ........................ | 524/230 |
| 5,676,714 | 10/1997 | Kodate . | |

FOREIGN PATENT DOCUMENTS

| | | |
|---|---|---|
| 0 469 750 A1 | 7/1991 | European Pat. Off. . |
| 1 555 070 | 11/1979 | United Kingdom . |
| 2 281 876 | 8/1993 | United Kingdom . |

Primary Examiner—Mark A. Osele
Attorney, Agent, or Firm—Gregory J. Feulner; Paul W. Busse

[57] ABSTRACT

A soft elastomeric disc for removal of polymeric compositions from an underlying substrate. The disc is useful for removing decorative decals, stripes, graphics, emblems, protective moldings, paint and adhesive and is made from a filled elastomeric composition. The elastomeric composition is filled with a system that combines an organic lubricant and a non-abrasive particulate.

26 Claims, 2 Drawing Sheets

PORTABLE APPARATUS FOR REMOVING HEAT SOFTENABLE SURFACE COVERINGS

INVENTIVE FIELD

This invention relates to the removal of adhered surface coverings from a substrate. In particular, the invention relates to a filled elastomeric composition, a rotatable disc made from the composition, an apparatus containing the same, and a method of removing such surface coverings without damage to the substrate to which they are adhered.

BACKGROUND OF THE INVENTION

Surface coverings such as decorative decals, stripes, graphics, emblems, and protective moldings are used extensively in a variety of applications. These surface coverings are typically adhered with pressure-sensitive adhesives to painted and unpainted surfaces of automobiles, trucks, airplanes, and boats. The pressure sensitive adhesives typically are based on acrylic polymers or elastomers which may have been modified by the addition of tackifiers and stabilizers to enable the surface covering item to adhere to the surface by finger or roller pressure.

In the process of repairing and repainting portions of a painted surface to which the surface coverings are adhered, removal of the coverings may be necessary. Removal of relatively thin surface coverings such as decals and pinstripes is presently done by removing the covering from the painted surface with a hand- or tool-held razor blade. Typically, this cutting process leaves the adhesive and small fragments of the surface covering on the surface which must thereafter be removed by vigorously rubbing the residue with a cloth or sponge soaked with a suitable solvent. Use of a razor blade may also damage the underlying surface paint.

Another removal procedure employs a heat gun to very carefully heat the surface covering so that a thin object such as a fingernail may be inserted under a softened edge to start removal and thereafter pulling on the edge to remove the remainder of the surface covering. However, relatively thin decals and stripes often do not have high tensile strength and usually tear free from the unremoved portion, thereby requiring the removal procedure to be initiated again. This procedure has the disadvantages of potentially overheating and damaging the painted surface from which the surface covering is removed, and it is a very tedious task.

Another existing problem occurs when emblems and protective side moldings on an automobile or truck are peeled from a surface. Adhesive residue is often left on both the emblem or molding and the painted surface of the automobile. The adhesive residue then must be removed from both surfaces, such as by vigorously rubbing the residue with a cloth or sponge soaked with a suitable solvent which is selected so that it will dissolve the adhesive residue but not harm the painted surface which bears it. While more aggressive solvents may facilitate faster removal of the adhesives, such solvents can damage some painted surfaces and may raise flammability and/or toxicity concerns. The adhesive residue on the emblem or the side molding must also be removed, usually by scraping, followed by solvent cleanup.

In response to these problems, systems have been developed that utilize a rotating polymeric disc. When the rotating disc is contacted with the surface covering, the resulting friction causes an increase in temperature. This temperature increase causes the adhesive to soften, and the emblem or molding can then be removed. An example of such a system is found in Winter, U.S. Pat. No. 5,269,874. Such systems have alleviated many of the above noted problems associated with the removal of adhered surface coverings. However, other concerns arise with rotating disc systems. For example, the hardness and abrasive properties of the disc must be controlled to ensure that the surface covering is removed without damaging the substrate. If the disc is too soft, insufficient heat will be generated and/or the disc material will smear onto the surface. If the temperature at the surface is too high, the underlying paint can be cracked or damaged, or airborne residue known as "fog" can be generated.

SUMMARY OF THE INVENTION

The present invention provides a filled elastomeric composition that contains an elastomer, about 2 to 43 wt-% of an organic lubricant selected from the group consisting of solid organic lubricants and polar organic lubricants and about 2 to 43 wt-% of a non-abrasive particulate, wherein the organic lubricant and nonabrasive particulate together comprise about 4 to 45 wt-% of the filled elastomeric composition. The invention also provides an apparatus, a rotatable body and a method that are useful for the effective, quick removal of heat softenable surface coverings.

The apparatus comprises a rotatable body having a peripheral surface and being rotatable about its axis, the body comprising at least one disc of a filled elastomeric composition that contains an elastomer, about 2 to 43 wt-% of an organic lubricant selected from the group consisting of solid organic lubricants and polar organic lubricants and about 2 to 43 wt-% of a non-abrasive inorganic particulate, wherein the organic lubricant and non-abrasive particulate together comprise about 4 to 45 wt-% of the filled elastomeric composition.

The present invention also provides a method for removing adhered heat softenable surface coverings from a heat stable substrate.

The rotatable body rotates at a speed that diminishes the integrity of the surface covering. The peripheral surface thereafter causes the heat softenable covering to be forcibly removed from the substrate surface. The portion of the peripheral surface which contacted the heat softenable surface covering thereafter attrites from the peripheral surface.

The organic lubricant and non-abrasive particulate together define a "filler system" that allows for the preparation of compositions particularly well suited for use in removal of heat-softenable surface coverings. The unique elastomeric compositions of the invention can be used with slow speed tools to allow selective removal of pressure sensitive adhesive bonded tapes and films from heat stable substrates with high efficiency, with minimum tangential force, very little or no surface residue, without undue temperature generation, without significant scratching, and without generating significant airborne residue.

All weight percentages are based on the total weight of the filled elastomeric composition absent an express statement to the contrary.

As used herein, "solid organic lubricant" means an organic lubricant that is solid at room temperature. "Polar organic lubricant" means an organic lubricant that has at least one polar substituent, e.g. at least one carboxyl, hydroxyl, sulfhydryl, amide, carbonyl, amino, ether, or siloxy group.

DETAILED DESCRIPTION OF THE PREFERRED EMBODIMENT

The present invention provides a filled elastomeric composition useful to make discs that can be used with power tools to remove heat softenable surface coverings from a heat stable substrate without appreciable damage to the substrate. The term "disc(s)" is meant to include wheels, fluted wheel structures or other structures with a substantially uninterrupted peripheral work surface. These discs comprise soft polymeric elastomeric matrixes that have a unitary disc structure or a disc structure formed by a plurality of thinner disc elements mounted on an arbor. The term "heat softenable material" is meant to denote a material that, when heated to a deforming temperature, softens to a point at which the material's integrity is diminished such that the material may be deformed when exposed to frictional forces.

The term "heat stable" with reference to a substrate is meant to denote that such material will not deform under the same frictional forces that the heat softenable material deformed under, when subjected to a temperature which is equal to or less than the deforming temperature.

The discs made with the elastomeric composition of the invention are used with a power tool to effectively remove decorative decals, stripes, adhesive residue, or other heat softenable surface coverings from most painted or unpainted automotive, truck, airplane, or boat surfaces without appreciable change or damage to the surfaces. More specifically, when used on a heat stable painted surface the paint is generally undamaged.

Heat softenable paint is often used to cover wooden articles such as furniture. Discs made of the filled elastomeric composition of the invention may be used to remove heat softenable paint from wooden surfaces without damaging the underlying wood. This method is much quicker and less labor intensive than scraping or sanding the wood, and does not require use of chemical stripping agents. This removal procedure can be performed with relative ease and less skill as compared with procedures currently used.

The discs made of the filled elastomeric composition have good mechanical strength and a low, controlled wear rate during use. Wear or attrition of the peripheral surface of the discs provides a self-cleaning disc. The discs should be sufficiently stiff to impart mechanical energy to the item being removed but not so stiff so as to impart excessive energy to the heat stable substrate and cause damage to the substrate. The energy imparted to the surface by the rotating discs of the invention is partially converted into thermal energy which heats the surface, and, if excessive, the resultant heat can cause painted surfaces to craze, wrinkle, blister, or completely lose the paint. Furthermore, the thermal energy may deform the substrate if excessive temperatures are reached.

Figure 1:
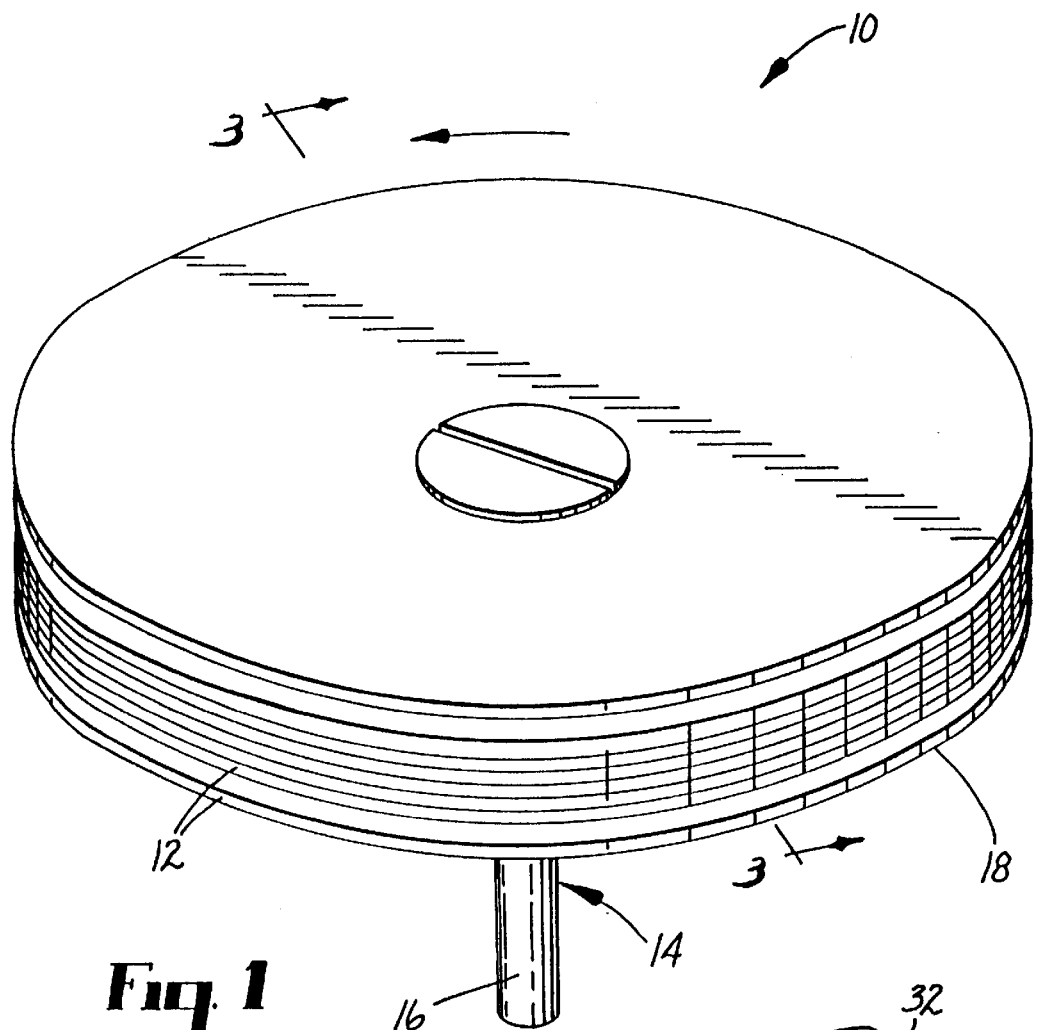
FIG. 1 is a perspective view of a plurality of elastomeric discs mounted on an arbor to provide one embodiment of an article of the present invention.
Figure 3:
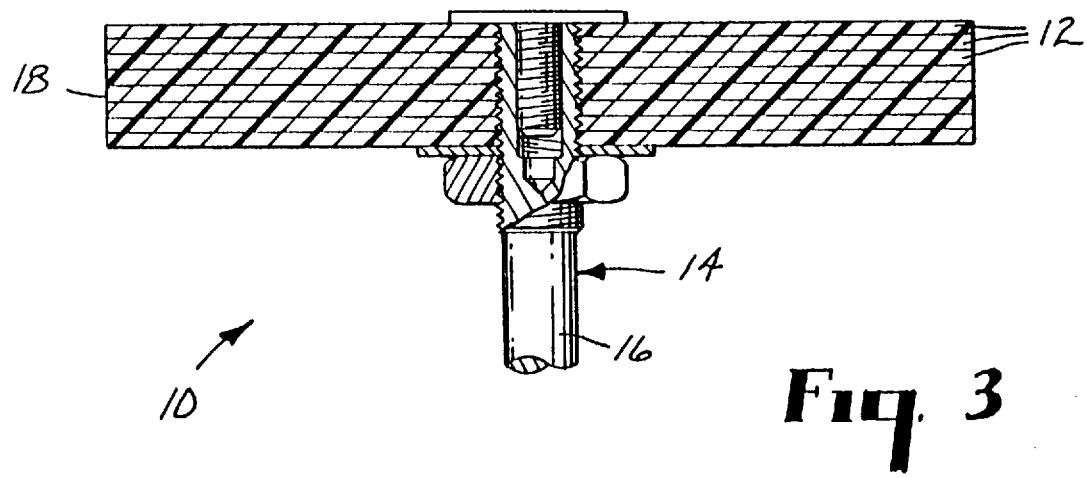
FIG. 3 is a sectional view taken at line 3—3 of the embodiment of FIG. 1.

Referring to FIGS. 1 and 3, a composite disc 10 of the present invention is shown. Composite disc 10 is comprised of thinner individual discs 12. The composite disc 10 is mounted to an arbor 14. The arbor 14 is adapted such that end 16 may be coupled to a power tool capable of rotating the composite disc 10 at speeds of at least 30 surface meters per minute. Removal of a heat softenable material occurs by urging edge 18 against the material for a period of time sufficient to remove the material.

Figure 2:
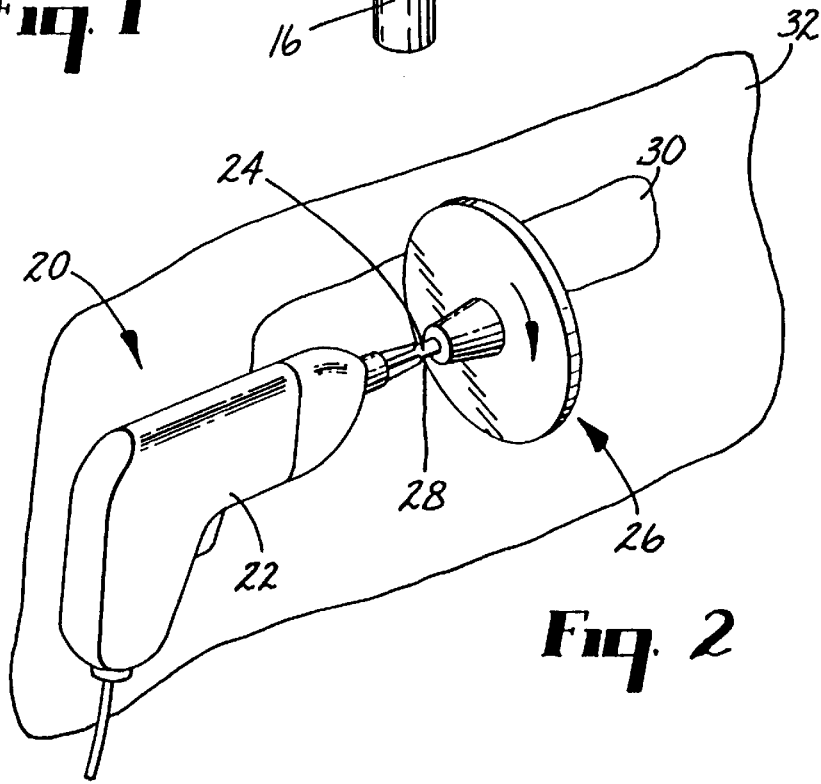
FIG. 2 is a perspective view of the apparatus of the present invention, in use, removing a heat softenable surface covering from a heat stable substrate.

Referring to FIG. 2, apparatus 20 of the present invention is shown removing a heat softenable material from a heat stable substrate. The apparatus 20 comprises a rotating means such as drill motor 22 coupled to an arbor 24, with a plurality of discs 26 secured to the arbor 24. The drill motor 22 rotates the discs 26 as a periphery 28 of the discs 26 contacts decal 30. The periphery 28 is urged against decal 30 causing the frictional contact to raise the temperature of decal 30 and the underlying adhesive which secures decal 30 to substrate 32. When the temperature reaches the deforming temperature of decal 30, a portion of the decal is removed from substrate 32, while at the same time a portion of the periphery is attrited from the discs 26. The attriting action results in a self-cleaning disc, free of any decal portions clung to its periphery. The drill motor 22 must have sufficient power to rotate the discs to a surface speed that results in the decal 30 achieving its deforming temperature.

Figure 4:
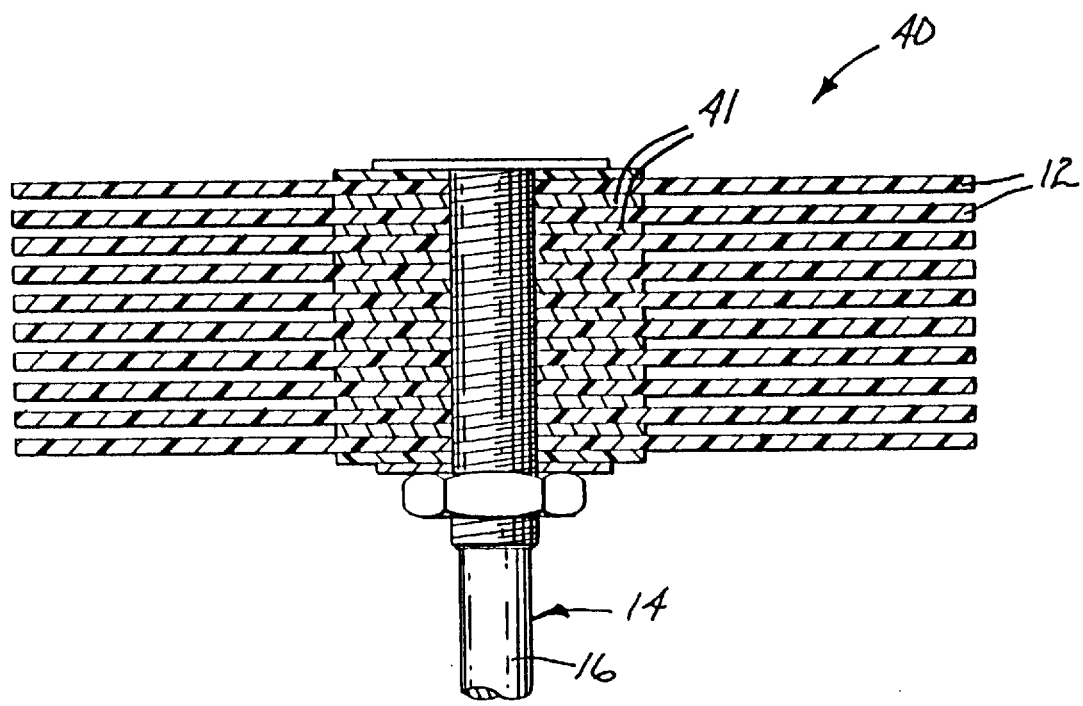
FIG. 4 is a sectional view of another embodiment according to the present invention which is similar to that of FIG. 1, but also includes spacers between elastomeric discs.

FIG. 4 shows a composite disc 40 which is similar to composite disc 10 shown in FIGS. 1 and 3 but it also includes spacers 41 between individual discs 12.

The discs are made of a filled elastomeric composition that contains an elastomer and a filler system. This composition allows for the formation of discs that will readily remove heat softenable surface coverings but will not crack, scratch, or otherwise cause significant damage to the substrate.

Elastomers employed in the composition of the invention can be either thermoplastic or thermosetting and should preferably have glass transition temperatures of less than about −20° C. Examples of useful thermoplastic materials include plasticized polyvinyl chloride (PVC), alkylenic block copolymer, styrenic block copolymer, thermoplastic polyester, thermoplastic polyurethane, ethylene-propylene elastomer, styrene/butadiene rubber, ethylene-propylene terpolymer rubber, thermoplastic polypropylene/ethylene-propylene copolymer blend, thermoplastic polyamide, copolymers thereof, and mixtures thereof.

Useful thermosetting polymeric elastomers include crosslinked polyurethanes, crosslinked acrylates, crosslinked natural rubber, crosslinked synthetic rubbers, crosslinked epichlorohydrin, crosslinked chlorosulfonated polyethylene, crosslinked ethylene-acrylic, and the like. Of these, a crosslinked polyurethane is generally preferred.

Optionally, a plasticizer can be added to the elastomer for the purpose of controlling mechanical properties such as hardness and improving forming processes. Any of the known plasticizers can be used, provided they are compatible with the elastomer and do not substantially adversely affect the properties of discs formed from the filled elastomeric composition. Alkyl benzylphthalates represent a preferred class of plasticizers. If present, a plasticizer is typically added to the filled elastomeric composition in an amount of about 9 to 22 weight percent.

The filler system used in the elastomeric compositions of the invention contains an organic lubricant and a non-abrasive particulate. This system allows one to control various properties of the disc, such as wear rate, coefficient of friction, and hardness.

The filler system makes up about 4 to 45 wt-% of the filled elastomeric composition. The amount of organic lubricant can range from about 2 to 23 wt-% of the filled elastomeric composition and the amount of non-abrasive particulate can range from about 2 to 23 wt-% of the filled elastomeric composition, so long as the combined amount of these components is about 4 to 45 wt-% based on the total weight of the filled elastomeric composition.

The organic lubricant acts to control adhesion of the elastomer to the substrate, the coefficient of friction of the disc, interface temperature generated, and wear rate. The organic lubricant is a lubricant selected from the group consisting of solid organic lubricants and polar organic lubricants. The organic lubricants are typically materials with long non-polar backbones that may have polar groups attached. Examples include fatty acids, fatty esters, fatty alcohols, fatty amides, metallic stearates, paraffinic and microcrystalline waxes, polyethylenes, oxidized polyethylenes, silicones, fluoroplastics, orthophosphoric acid esters, and the like. Carboxylic acids having 10 to 50 carbon atoms or a salt or derivative thereof are preferred, with salts of stearic acid particularly preferred. Examples of useful organic lubricant materials include stearic acid, lithium stearate, calcium stearate, aluminum stearate, and ethylene-bis-stearamide. Mixtures of various organic lubricants can be used if desired. The organic lubricant is present in an amount of about 2 to 43 wt-%, and preferably about 5 to 20 wt-%.

The non-abrasive particulate component of the filler system provides the filled elastomeric composition with control of wear rate and hardness. This particulate may be either organic or inorganic. Any particulate material that is compatible with the elastomer and will not cause scratching of painted or coated surfaces may be used. Suitable particulates will generally have a Mohs hardness value of 1 to about 3, and an average particle diameter of about 0.1 to 3 micrometers. Examples of useful inorganic non-abrasive particulate materials include talc, calcium carbonate, and aluminum trihydrate. Useful organic non-abrasive particulate materials include corn starch and dextrin. Mixtures of two or more nonabrasive particulate materials can be used if desired. The non-abrasive particulate is present in an amount of about 2 to 43 wt-%, preferably about 5 to 20 wt-%.

The amounts of organic lubricant and non-abrasive particulate may also be expressed as the weight ratio of one component to the other. Within the ranges specified above, filler systems wherein the organic lubricant and the non-abrasive particulate are present in a weight ratio of about 8:1 to 1:8 are preferred, with a weight ratio of about 5:1 to 1:5 particularly preferred.

The filled elastomeric compositions used to make the discs of the invention can have a foamed structure with a density slightly less than the solid unfoamed polymer although such foaming is not necessary.

If present, the amount of foam should be balanced with the amount of filler used to provide a composition with the desired density. Very low density foamed polymeric elastomers may not be sufficiently stiff to impart adequate energy to remove the decals and adhesive residue. As the polymeric material becomes somewhat stiffer, however, the potential for being too aggressive can be partially offset by using foamed elastomeric compositions having lower densities.

Preferably the elastomeric composition should have a Shore A hardness of about 10 to 90. Materials softer than about Shore 10 A may be used but are generally not economically effective in removing decals and adhesive residues due to the disc attriting so quickly during use. Discs harder than about Shore 90 A may tend to damage some painted surfaces while removing decals and adhesive residue. However, these discs could be used when removing graphics, decals, or adhesive from unpainted surfaces or when there is little concern for the integrity of the paint underlay.

The filled elastomeric composition is formed into discs having a thickness of about 2 mm to 25 mm. If a single disc is used, it will typically have a thickness of about 10 mm to 20 mm. If a plurality of discs is used, each disc will typically have a thickness of about 2 mm. The disc or discs are placed and secured on an arbor so as to make a wheel of the thickness suited to the need of the application and the power of the drive tool. The disc(s) generally have a kinetic coefficient of friction of about 0.5 to 3.0.

The disc(s) of the invention is mounted on an arbor of a rotary power tool, which may be a portable hand-held air tool, an electrically powered tool, a stationary rotating shaft, or a rotating shaft supported by a robot arm. The discs should be mounted to a tool capable of rotating at least 30 surface meters per minute. The discs of the invention are ordinarily rotated at about 320 to 640 surface meters per minute. Discs having a larger diameter can be rotated at somewhat higher surface speeds than smaller discs to achieve optimum performance. It is postulated the periphery of larger discs accumulate less thermal energy as there is more time to dissipate some thermal energy before energy is added by re-engagement with the work surface.

The discs of the invention should have adequate mechanical strength to resist fracture when rotated at speeds greater than about 1550 surface meters per minute, preferably greater than about 1825 surface meters per minute. Inadequate mechanical strength would limit the speed at which the discs could be rotated, which would increase the time required to remove decals or adhesive residue. Further problems encountered with discs having inadequate resistance to fracture include safety hazards such as stray pieces of the discs fracturing off and hitting the user's body.

While removing heat softenable surface coverings, the discs of the invention must slowly wear away to regenerate a disc surface which is substantially free of surface covering residue being removed.

The wearing away or attrition of portions of the peripheral surface act in a way to self clean the discs. If the disc is too wear resistant, adhesive residues accumulate on the working surface, resulting in a slower removal of surface coverings. The accumulated adhesive residue on the periphery of the disc can also smear adhesive residue back onto the surface from which it was removed and be very difficult to remove by methods such as wiping with a solvent soaked cloth. It has been found that discs with a peripheral surface width of 16 mm should preferably have a wear rate greater than about 0.2 gram per minute when operated at the above described speeds to remove the pressure sensitive adhesive attachment tape and also be self-cleaning. On the other hand, discs with very high wear rates, e.g., greater than about 5 grams per minute per 16 mm length, tend to be less economical. The preferred wear rate is about 0.8 grams per minute per 16 mm length when operated at the speeds referred to above.

The following examples are illustrative of the invention and parts and percentages are by weight unless specified otherwise.

EXAMPLES

Glossary of Materials

Poly bd
"Poly bd Resin R-45HT", a hydroxy-terminated homopolymer of 1,3-butadiene, commercially available from Atochem North America, Inc., Polymers Division, Philadelphia, Pa.

Plasticizer
"Santicizer 261", a $C_7$–$C_9$ alkyl benzylphthalate plasticizer, commercially available from Monsanto Company, St. Louis, Mo.

Terathane 2000
polyether glycol [poly(oxy-1,4-butandiyl)-α-hydro-ω-hydroxy], commercially available from duPont Specialty Chemicals, Wilmington, Del.

1,4-butanediol
commercially available from GAF Chemicals Corporation, Wayne, N.J.

DABCO 33-LV
catalyst comprising 33% triethylenediamine in dipropylene glycol, commercially available from Air Products and Chemicals, Inc., Allentown, Pa.

lithium stearate
lubricant lithium stearate "#306", commercially available from Witco Organics Division, Witco Corporation, Chicago, Ill.

talc
"Mistron Monomix Talc", commercially available from Luzenac America, Inc., Englewood, Colo.

MDI
"Isonate 143L", diphenylmethanediisocyanate, commercially available from Dow Plastics, Midland, Mich.

calcium carbonate
"SUPERMITE ULTRAFINE" ground natural calcium carbonate, commercially available from ECC International, Atlanta, Ga.

calcium stearate
technical grade, commercially available from Witco Organics Division, Witco Corporation, Chicago, Ill.

dextrin
STADEX 140—partially hydrolyzed starch. A. E. Staley Manufacturing Company, Decatur, Ill. 62525.

Example 1

The ingredients set forth in Table 1 were mixed in a 1000 ml polyethylene beaker in the order listed with the air-powered mixer activated. The lithium stearate and talc were dried for at least 24 hours at 220° F. (140° C.) in a laboratory air oven, and the 1,4-butanediol was stored over molecular sieve type 3H (1/16 in. pellets). The mixed composition was transferred to a steel ring mold having an interior diameter of 4.09 inches (10.39 cm) and a depth of 0.75 inch (1.90 cm). The depth of the mold was reduced to 5/8 inch (1.59 cm) by placing a 1/8 inch (0.32 cm) thick polyethylene disc in the ring prior to casting. All mold components were coated with a silicone mold release agent. The ring mold was placed on a 9 inch×9 inch×1/4 inch (22.9 cm×22.9 cm×0.64 cm) steel plate and the mixed composition was poured into the mold. The mold assembly was allowed to stand at room temperature for 18 hours. The hardened cast disc was removed from the mold and a 3/8-inch (0.95 cm) center hole was drilled with an automated drill press.

TABLE 1

| Component | Parts by Weight |
| --- | --- |
| Poly bd | 200 |
| plasticizer | 70 |
| Terethane 2000 | 30 |
| 1,4 butanediol | 6 |
| DABCO 33-LV | 0.5 |
| lithium stearate | 45 |
| talc | 45 |
| MDI | 51.3 |

Test Methods

Test panels were prepared as follows. 3-inch×12-inch (7.62 cm×30.48 cm) strips of "Scotchcal™ High Performance Auto Grade Film", commercially available from Minnesota Mining and Manufacturing Company, St. Paul, Minn., and 1-inch×12-inch (2.54 cm×30.48 cm) strips of "Scotch® 4210 Acrylic Foam Tape", commercially available from Minnesota Mining and Manufacturing Company, St. Paul, Minn. were applied to 18 in.×30 in.×1/32 inc. thick (45.72 cm×76.20 cm×0.79 mm thick) Clear/Color Automotive Black painted panels prepared by ACT Laboratories, Inc. of Hillsdale, Mich. After the application of the film and tape strips, the panels were heated for 30 minutes at 180° F. (82.2° C.) in a forced convection oven to "age" the specimens.

Removal Test

The disc of Example 1 was weighed and secured on a steel mandrel between 1.5 inch (3.81 cm) diameter steel washers. The mandrel was then mounted in the chuck of a "SNAP-ON Blue Point II" (Snap-On, Inc., Kenosha, Wis.) air drill that was supplied with 98 psi air via a 1/4 inch (0.64 cm) interior diameter hose. When activated, the air drill rotated the test disc at 1900 to 2000 rpm under load. For the removal test, the rotating disc was urged against the film and tape strips until they were successfully removed from the painted panel. The time required for removal was recorded and the disc was weighed again to determine the amount of wear. The test results are reported in Table 2.

Paint Damage Test

The disc of Example 1 was dressed to provide a fresh, uncontaminated surface by lightly urging the rotating disc against a 5-inch (12.7 cm) "SURFORM" rasp (The Stanley Works, New Britain, Conn.) that was attached to a piece of wood. The disc was then allowed to cool to room temperature. While being driven at 1900 to 2000 rpm, the disc was then urged against a 1-inch (2.54 cm) diameter spot on the ACT-prepared panel (2 in.×11 in.×1/32 in.) (5.1 cm×27.9 cm×0.08 cm) for 20 seconds. The panel was held in a fixture on a triple beam balance set at 1000 g. The spot was then cleaned with isopropanol and visually examined for the presence of scratches and/or cracks. The atmosphere near the disc was visually examined for the presence of airborne residue from the test (fogging). The results are shown in Table 2.

TABLE 2

| Property | Example 1 |
| --- | --- |
| Hardness (Shore A) | 64 |
| Film Removal Time (seconds) | 38 |
| Wear to remove film (grams) | 0.9 |
| Tape Removal time (seconds) | 35 |
| Wear to remove tape (grams) | 1.8 |
| Scratching: | <1 |
| 0 = none | |
| 10 = deep scratches | |
| Heat-induced surface cracking | no |
| Fogging: | 0–1 |
| 0 = none | |
| 10 = clouds of aerosol generated | |

For each of Examples 2 through 17, the components set forth in Table 4 were combined and formed into a disc in the manner described for Example 1.

Example 18 is a composition representative of those described in Winter, U.S. Pat. No. 5,269,874. The composition of Example 18 is shown in Table 3.

TABLE 3

| Ingredient | Amount (parts by weight) |
| --- | --- |
| Poly(vinyl chloride) ("Oxy 410", available from Occidental Chemical Corporation) | 100 |
| Triisononyl trimellitate | 95 |
| Therm-check 130 heat stabilizer, available from Ferro Corp. | 5 |
| Therm-check 5221 stabilizer, available from Ferro Corp. | 1 |
| Admix 710 epoxidized soybean oil, available from Velsicol Chemical Corp. | 6 |
| Stearic acid | 0.25 |
| Diisononyl phthalate | 0.4 |

TABLE 3-continued

| Ingredient | Amount (parts by weight) |
|---|---|
| Kempore 200 MC, available from Uniroyal Chemical Co. | 0.4 |

Amounts in Table 4 are expressed in parts by weight. The removal and paint damage tests were performed as described for Example 1. Results are reported in Table 5.

I claim:

1. An apparatus for removing an adhered heat softenable surface covering from the surface of a heat stable substrate without damage to the substrate comprising at least one disc made of a filled elastomeric composition comprising an elastomer, about 2 to 43 wt-% of an organic lubricant selected from the group consisting of solid organic lubricants and polar organic lubricants and about 2 to 43 wt-% of a non-abrasive particulate, wherein the organic lubricant and the nonabrasive particulate together comprise about 4 to 45 wt-% of the filled elastomeric composition.

2. The apparatus of claim 1 wherein the elastomeric composition has a Shore A hardness of about 10 to 90.

TABLE 4

| Component | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Poly bd | 200 | 200 | 200 | 200 | 200 | 200 | 200 | 200 | 200 |
| poly(vinyl chloride) | 0 | 0 | 0 | 0 | 0 | 0 | 0 | 0 | 0 |
| plasticizer | 70 | 0 | 70 | 70 | 0 | 35 | 70 | 70 | 0 |
| Terethane 2000 | 30 | 30 | 30 | 30 | 30 | 30 | 30 | 30 | 30 |
| 1,4 butanediol | 6 | 6 | 6 | 6 | 6 | 6 | 6 | 6 | 6 |
| DABCO 33-LV | 0.5 | 0.5 | 0.5 | 0.5 | 0.5 | 0.5 | 0.5 | 0.5 | 0.5 |
| lithium stearate | 45 | 45 | 45 | 60 | 30 | 25 | 20 | 20 | 100 |
| talc | 45 | 0 | 20 | 30 | 60 | 25 | 20 | 100 | 20 |
| MDI | 51.3 | 51.4 | 51.3 | 51.3 | 51.3 | 51.3 | 51.3 | 51.3 | 51.3 |
| calcium carbonate | 0 | 45 | 25 | 0 | 0 | 0 | 0 | 0 | 0 |
| calcium stearate | 0 | 0 | 0 | 0 | 0 | 0 | 0 | 0 | 0 |
| added water | 0 | 0 | 0 | 0 | 0 | 0 | 0 | 0 | 0 |

| Component | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Poly bd | 200 | 200 | 200 | 200 | 200 | 200 | 200 | 200 | 0 |
| poly(vinyl chloride) | 0 | 0 | 0 | 0 | 0 | 0 | 0 | 0 | 48 |
| plasticizer | 70 | 0 | 70 | 70 | 0 | 35 | 70 | 70 | 0 |
| Terethane 2000 | 30 | 30 | 30 | 30 | 30 | 30 | 30 | 30 | 0 |
| 1,4 butanediol | 6 | 6 | 6 | 6 | 6 | 6 | 6 | 6 | 0 |
| DABCO 33-LV | 0.5 | 0.5 | 0.5 | 0.5 | 0.5 | 0.5 | 0.5 | 0.5 | 0 |
| lithium stearate | 0 | 0 | 0 | 75 | 45 | 45 | 0 | 45 | 0 |
| talc | 45 | 0 | 0 | 15 | 45 | 45 | 0 | 0 | 0 |
| MDI | 51.3 | 51.3 | 51.3 | 51.3 | 51.3 | 51.3 | 51.3 | 51.3 | 0 |
| calcium carbonate | 0 | 0 | 0 | 0 | 0 | 0 | 0 | 0 | 0 |
| calcium stearate | 45 | 0 | 0 | 0 | 0 | 0 | 0 | 0 | 0 |
| added water | 0 | 0 | 0 | 0 | 0 | 0 | 0.4 | 0 | 0 |
| dextrin | 0 | 0 | 0 | 0 | 0 | 0 | 0 | 45 | 0 |
| Plasticizer/Stabilizer/ blowing agent | 0 | 0 | 0 | 0 | 0 | 0 | 0 | 0 | 52 |

TABLE 5

| Property | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Hardness, Shore A | 64 | 62 | 62 | 65 | 70 | 60 | 60 | 74 | 68 |
| Film Removal Time, seconds | 38 | 40 | 42 | 44 | 48 | 45 | 46 | 43 | 52 |
| Wear to remove film, grams | 0.9 | 1.0 | 1.1 | 0.9 | 1.3 | 1.3 | 1.5 | 1.5 | 1.1 |
| Tape Removal Time, seconds | 35 | 35 | 39 | 43 | 36 | 39 | 38 | 37 | 47 |
| Wear to Remove Tape, grams | 1.8 | 1.8 | 2.0 | 2.6 | 1.0 | 1.8 | 1.8 | 1.8 | 2.7 |
| Scratching (0–10)[1] | <1 | <1 | 0 | <1 | <1 | 0 | 0 | <1 | <1 |
| Cracking (0–10)[2] | 0 | 0 | 0 | 0 | 0 | 0 | 0 | 0 | 0 |
| Fogging (0–10)[3] | 0–1 | 0–1 | 0–1 | 0–1 | 0–1 | 0–1 | 0–1 | 0–1 | 0–1 |

| Property | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Hardness, Shore A | 67 | 70 | 57 | 68 | 82 | 73 | 40 | 68 | 82 |
| Film Removal Time, seconds | 49 | 55 | 50 | 41 | 41 | 41 | 72 | 47 | 89 |
| Wear to remove film, grams | 2.0 | 0.3 | 2.4 | 1.0 | 0.7 | 1.0 | 9.3 | 1.1 | 12.9 |
| Tape Removal Time, seconds | 41 | 34 | 38 | 42 | 37 | 38 | n.d.[4] | 38 | 53 |
| Wear to Remove Tape, grams | 2.6 | 0.4 | 6.8 | 1.8 | 0.8 | 1.1 | n.d. | 1.6 | 8.0 |
| Scratching (0–10) | <1 | <1 | <1 | 0 | <1 | <1 | 0 | <1 | 0 |
| Cracking (0–10) | 0 | 8 | 0[5] | 0 | 0 | 0 | 0[5] | 0 | 0 |
| Fogging (0–10) | 0–1 | 2–3 | 2–3 | 0–1 | 0–1 | 0–1 | 0–1 | 0–1 | 0 |

[1] 0 = no scratches; 10 = deep scratches
[2] heat-induced surface crazing, 0 = none; 10 = severe crazing
[3] aerosol generation during test, 0 = none; 10 = clouds of aerosol generated
[4] n.d. = not determined
[5] permanent paint appearance change to a light gray in contact area 3. The apparatus of claim 1 wherein the apparatus comprises a single disc.

4. The apparatus of claim 1 wherein a portion of a peripheral surface of the at least one disc is attrited to provide a renewed peripheral surface of the disc for contact with the surface covering.

5. The apparatus of claim 4 wherein the at least one disc has a surface wear rate of at least about 0.2 g/min/16 mm length.

6. The apparatus of claim 1 wherein the disc has a thickness of about 2 to 25 mm.

7. The apparatus of claim 1 wherein the at least one disc has a kinetic coefficient of friction of about 0.5 to 3.0.

8. The apparatus of claim 1 further including means for rotating the apparatus around a central axis of rotation.

9. The apparatus of claim 1 wherein the organic lubricant and the nonabrasive particulate are present in a weight ratio of about 8:1 to 1:8.

10. The apparatus of claim 1 wherein the non-abrasive particulate has a Mohs value of 1 to about 3.

11. The apparatus of claim 1 wherein the non-abrasive particulate comprises calcium carbonate, dextrin, talc or a mixture thereof.

12. The apparatus of claim 1 wherein the non-abrasive particulate comprises talc.

13. The apparatus of claim 1 wherein the non-abrasive particulate comprises particles having an average diameter of about 0.1 to 3 micrometers.

14. The apparatus of claim 1 wherein the organic lubricant comprises a polyethylene wax or paraffin.

15. The apparatus of claim 1 wherein the organic lubricant comprises a carboxylic acid having 10 to 50 carbon atoms or a derivative thereof.

16. The apparatus of claim 1 wherein the organic lubricant comprises a salt or an amide of stearic acid.

17. The apparatus of claim 1 wherein the organic lubricant comprises stearic acid, ethylene-bis-stearamide, lithium stearate, calcium stearate, aluminum stearate, or a mixture thereof.

18. The apparatus of claim 1 wherein the organic lubricant comprises lithium stearate.

19. The apparatus of claim 1 wherein the elastomer comprises a thermoplastic polymer.

20. The apparatus of claim 1 wherein the elastomer comprises an alkylenic or styrenic block copolymer; a polyester; a rubber; a polyamide; polyvinyl chloride; or a mixture thereof.

21. The apparatus of claim 1 wherein the elastomer comprises a thermoset polymer.

22. The apparatus of claim 1 wherein the elastomer comprises a crosslinked polyurethane.

23. The apparatus of claim 1 further comprising a plasticizer.

24. The apparatus of claim 1 wherein the plasticizer comprises an alkyl benzylphthalate.

25. A method of removing an adhered heat softenable surface covering from a surface of a heat stable substrate substantially without damage to said substrate, the method comprising the steps of:

(a) providing a rotatable body having a peripheral surface and being rotatable about its axis, said body comprising at least one disc made of a filled elastomeric composition comprising an elastomer, about 2 to 43 wt-% of an organic lubricant selected from the group consisting of solid organic lubricants and polar organic lubricants and about 2 to 43 wt-% of a nonabrasive particulate wherein the organic lubricant and the non-abrasive particulate together comprise about 4 to 45 wt-% of the filled elastomeric composition;

(b) rotating the rotatable body to provide a rotating body;

(c) contacting a portion of said peripheral surface of said rotating body with said heat softenable surface covering to be removed, causing said surface covering to increase in temperature and thereafter forcibly removing said surface covering by said portion of said peripheral surface from said heat softenable substrate; and (d) attriting said peripheral surface of said rotating body by continued rotation thereof.

26. An apparatus for removing an adhered heat softenable surface covering from the surface of a heat stable substrate without damage to the substrate comprising at least one rotatable body having a peripheral surface wherein the rotatable body is made of a filled elastomeric composition comprising an elastomer, about 2 to 43 wt-% of an organic lubricant selected from the group consisting of solid organic lubricants and polar organic lubricants and about 2 to 43 wt-% of a non-abrasive particulate, wherein the organic lubricant and the non-abrasive particulate together comprise about 4 to 45 wt-% of the filled elastomeric composition.

* * * * *